Jan. 30, 1962 G. WERTWIJN 3,019,352
TETRODE TRANSISTOR CIRCUIT
Filed Dec. 16, 1958

INVENTOR
George Wertwijn
BY Francis W. Crotty
ATTORNEY 3,019,352

TETRODE TRANSISTOR CIRCUIT

George Wertwijn, Park Ridge, Ill., assignor to Zenith Radio Corporation, a corporation of Delaware Filed Dec. 16, 1958, Ser. No. 780,732
6 Claims. (Cl. 307—88.5)

This invention pertains to transistor devices and is especially directed to transistors of the tetrode type.

Tetrode transistors as previously constructed have had shortcomings with respect to both their high frequency characteristics and operating efficiency. The properties of the typical prior art structure contributing to these deficiencies are considered in more detail hereinafter.

It is an object of this invention to provide a tetrode transistor which avoids or minimizes such deficiences of prior art devices.

It is a specific object of the invention to provide a tetrode transistor of novel construction exhibiting improved high frequency properties and/or efficiency.

The features of the invention which are believed to be novel are set forth in the appended claims. The invention, together with further objects and advantages thereof, may best be understood by reference to the following description taken in conjunction with the accompanying drawings in the several figures of which like reference characters identify corresponding components throughout, and in which:

Figure 1:
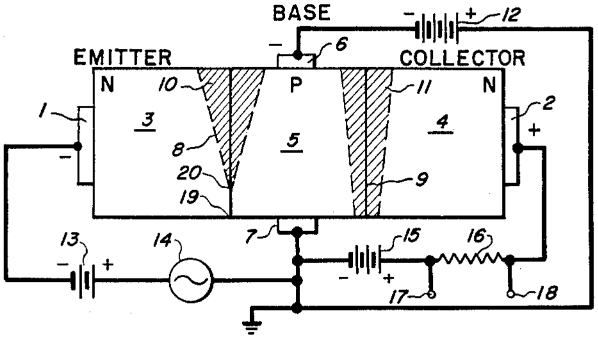
FIGURE 1 is a schematic representation of a tetrode type transistor typical of the prior art construction.

Referring now more particularly to FIGURE 1, the transistor there represented is of the tetrode type and comprises a semi-conductor body having two conductivity zones of one type and an interposed conductivity zone of opposite type conductivity, collectively defining the usual base-emitter and base-collector junctions. Specifically and for purposes of illustration, the semi-conductor body has two zones, 3, 4 of N-type conductivity and an intermediate zone 5 of P-type conductivity. Zones 3 and 4 are germanium doped with arsenic and zone 5 is germanium doped with indium. Of course, it will be understood that the specific arrangement of conductivity zones is of no moment and it is indeed acceptable to utilize a P-N-P arrangement of conductivity zones.

The transistor has the usual electrodes coupled in signal-translating relation to the base-emitter and base-collector junctions. As represented, the emitter electrode 1 is in ohmic contact with emitter zone 3; collector electrode 2 is likewise in ohmic contact with collector zone 4 and the two base electrodes 6 and 7 are in ohmic contact with the base zone 5.

The biasing arrangement for the transistor includes a battery 13 connected between emitter electrode 1 and base electrode 7 to establish a forward bias therebetween. A battery 15 and load resistor 16 connected between base electrode 7 and collector electrode 2 establish a reverse bias in the usual way. Battery 12, which is connected between base electrodes 6 and 7, is provided to establish current flow across zone 5 from one base electrode to the other; the polarity and magnitude are so chosen as to result in back-biasing most of the base-emitter junction 8. A signal to be translated is applied from a source 14 between emitter electrode 1 and base electrode 7 while an amplified output signal is derived across load resistor 16 as indicated by output terminals 17 and 18.

In explaining the operation of the described structure, it is appropriate to consider initially the conditions established within the transistor without regard to the translation of a signal from input to output.

Battery 12 is chosen to represent a higher potential than that of battery 13 and it, in conjunction with biasing sources 13 and 15, establishes two depletion zones 10 and 11 about the base-emitter junction 8 and base-collector junction 9, respectively.

Current flow from base electrode 6 to base electrode 7 establishes a potential gradient across zone 5 having a maximum value in the vicinity of base electrode 6 and substantially zero at base electrode 7. Zone 3 of the transistor is at the potential established by source 13 and has a substantially zero potential in the transverse direction. In view of the relative magnitudes of batteries 12 and 13, the base-emitter junction 8 is reverse biased in the vicinity of electrode 6 and this bias decreases to zero at the point 20, then reverses so that the portion 19, 20 of the junction is forwardly biased. As a consequence, the effective portion of the base-emitter junction, effective in the sense of signal translation, is that defined by the area 19—20.

Battery 15 is selected so that the depletion zone 11 in the region of base-collector junction 9 is similar to that customarily established by virtue of the back bias of the base-collector junction in a triode-type transistor amplifier. Specifically, there is a back bias established along this entire junction.

The application of an input signal from source 14 to emitter electrode 1 modifies the area of junction portion 19—20 which is forwardly biased and consequently modifies the rate at which minority carriers are injected into zone 5 from zone 3. More particularly, in any operating interval in which the signal applied to emitter electrode 1 swings negatively, the effect is similar to an increase in magnitude of forward bias battery 13 and results in enlarging of junction portion 19—20 which is forwardly biased. At the same time, the potential difference across base-emitter junction 8 is increased and the rate of carrier injection is increased accordingly. Conversely, a signal variation of positive polarity restricts, or decreases, the forwardly-biased portion 19—20 of junction 8 and reduces the potential drop across the junction with a corresponding decrease in the rate of injected carriers. In short, minority carriers injected through portion 19—20 of junction 8 are modulated to represent the amplitude excursions of applied signal. The injected carriers produce a resistance modulation of the base zone of the transistor and reflect signal variations in the base-collector current in the usual way. As a consequence, a corresponding potential variation is developed across load resistor 16 and constitutes an amplified replica of the applied signal.

As thus far described, the tetrode transistor is of known construction and operation. It is subject to well-defined advantages and disadvantages. One advantage is that the effective base resistance is reduced with a resulting increase in transistor efficiency. Also, a concentration of injected carriers, resulting from the restriction of the emission to the forwardly biased portion 19—20 of junction 8, increases the concentration of carriers and hence the diffusion rate across the base. This is akin to a reduction of transit time and increases the frequency capabilities of the device. Moreover, the reduction in effective area of the base-emitter junction reduces the apparent capacitance between the emitter and collector.

Among the disadvantages of the prior art structure is the tendency of injected carriers to be attracted to base electrode 7 because of the voltage gradient established between electrodes 6, 7 with an attendant reduction in signal translation to the collector circuit. Furthermore, the described structure suffers from an increased amount of recombination of injected minority carriers with majority carriers or holes in the base. The increased recombination is attributable, at least in part, to the location of the base electrodes with respect to the junctions. It is desirable for higher frequency operations to construct the junctions less than one diffusion length apart. However, the geometry of the prior art device necessitates placing the base electrodes between the junctions and reduces the distance between the base electrodes and junctions to a point where losses are substantial due to recombination across the ohmic-semiconductor junction of the base electrodes. Another loss results from recombination of carriers due to the carrier path being through that portion of the semi-conductor which is subject to deformations due to the affixing of the base electrodes. The tetrode structure of the present invention illustrated in FIGURES 2, 3 and 4 overcomes or minimizes these disadvantages while, at the same time, retaining the advantages characteristic of the tetrode device.

Figure 2:
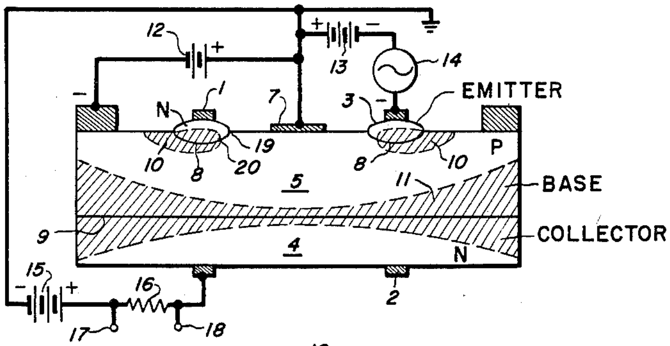
FIGURE 2 represents an improved tetrode transistor constructed in accordance with the invention.

Referring now more paritcularly to FIGURE 2, a tetrode transistor embodying the present invention is shown having a conductivity zone 5 serving as the base, a zone 4 of opposite conductivity constituting the collector and an emitter zone 3 of the same conductivity type as the collector zone. For purposes of present discussion this is an N-P-N transistor, although the conversed polarities may, of course, be employed. The body of the transistor comprising zones 4 and 5 is a germanium wafer of circular cross-section and zone 3 is of annular or ring type configuration forming the base-emitter junction 8 with zone 5. Electrode 1 connects with emitter ring 3 to facilitate the application of the bias of battery 13 and input signal of source 14 in similar manner to the arrangement of FIGURE 1. A collector ring 2 permits connecting battery 15 and output impedance 16 to the collector zone. In similar fashion base electrode 6, to which bias battery 12 connects, is also annular in form while the grounded base electrode 7 is a dot type of ohmic contact positioned at the center of the wafer and, therefore, lying at the geometrical center of emitter ring 3 and base ring 6. The several biasing sources 12, 13 and 15 have the same relative magnitude and polarities as those of FIGURE 1.

The modified structure of FIGURE 2, under the influence of biasing potentials applied to its electrodes, establishes depletion zones 10 and 11 in generally similar manner to that explained in connection with the prior art structure of FIGURE 1. Because of the differences in geometrical arrangement and configuration, these depletion zones have significantly different dispositions within the transistor structure; this is especially the case for depletion zone 10. It will be observed that zone 10 which is annular in form extends essentially radially outwardly from zone 3 in the direction of base electrode 6, presenting junction section 19, 20, which is subject to forward biasing in the manner explained heretofore in connection with the discussion of FIGURE 1, at the innermost section of zone 3. This is significant in relation to the path of travel of the majority of injected carriers as explained hereinafter. Depletion zone 11 established about the base-collector junction 9 intervenes conductivity zones 4 and 5 throughout the wafer.

In operation, the transistor of FIGURE 2 functions in essentially the same manner as that of FIGURE 1, except that because of the disposition of the section 19, 20 of the base-emitter junction which is subject to the forward bias, the injected carriers tend to be directed vertically downwardly in the direction of base-collector junction 9. This is in contradistinction to FIGURE 1 wherein the carriers are injected in a direction generally to or across base-electrode 7. It is recognized that a small portion of the injected carriers do migrate toward and some are collected at base-electrode 7, but the preponderance of the injected carriers travel in the direction of the base-collector junction. Accordingly, the efficiency of this tetrode transistor is markedly improved over the conventional structure of FIGURE 1, resulting in part from the reduced tendency to recombination.

Additionally, the described structure facilitates control of the frequency characteristics of the transistor in that adjustment of the relative potentials applied to the base and collector electrodes permits control of the separation of depletion zone 11 relative to that section 19, 20 of the base-emitter junction which is subject to forward bias. As the space separation of these two portions of the device is reduced, the high frequency capabilites of the structure are increased.

Figure 3:
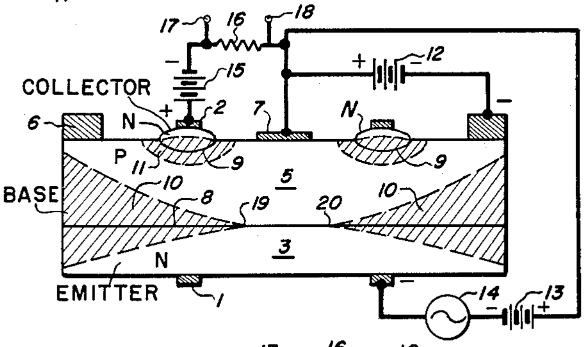
FIGURES 3 and 4 represent further embodiments of the invention.

The modification of FIGURE 3 is, in practical effect, the same as that of FIGURE 2 except that in this embodiment of the invention the roles of conductivity zones 3 and 4 have been interchanged, zone 3 now serving as the emitter and zone 4 as the collector. The biasing arrangement is, of course, changed to the end that the base-emitter and base-collector junctions have the same biases explained in connection with FIGURE 2.

In this case the back bias imposed on base-emitter junction 8 is a maximum at the periphery of the semi-conductor wafer and decreases in a radially inwardly direction. Consequently, the portion 19, 20 of this junction which is subject to a forward bias is located approximately in the central section of the junction. The operation of this form of tetrode is generally the same as that described in connection with FIGURE 2. This embodiment has the advantage that the forwardly biased area of the emitter junction 8 is located in a region where the crystal has the least imperfections and has undergone no distortion due to surface cleaning or to the affixing of the electrodes. Moreover, the portion 19, 20 which is forwardly biased may be restricted to a very small area while, at the same time, retaining its desired location within the semi-conductor.

Figure 4:
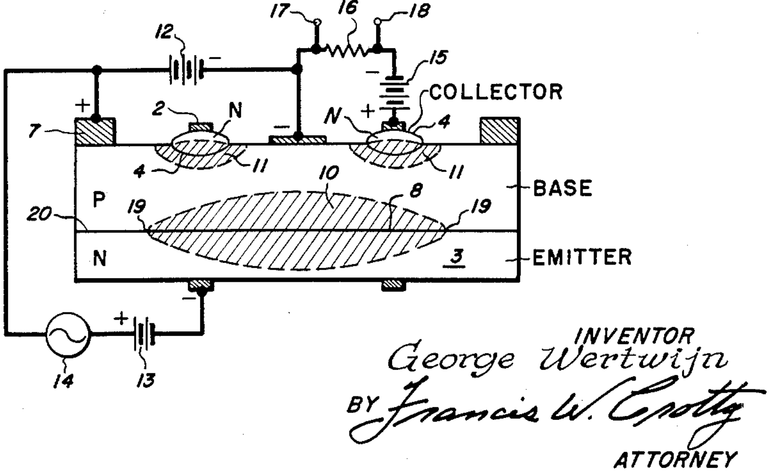

The embodiment of FIGURE 4 is the same as that of FIGURE 3 except that the polarity of battery 12 has been reversed. As a result, the positions of the maximum reverse bias and forward bias of the base-emitter junction are interchanged. Specifically, the portion 19, 20 of the junction subject to forward bias extends radially inwardly from the outer periphery of the semi-conductor.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A transistor device comprising: a semi-conductor body having a first conductivity zone of one type and having a pair of conductivity zones of a second type defining with said first zone base-emitter and base-collector junctions; a pair of base electrodes one of which is positioned approximately at the geometrical center of one face of said first zone and the other having portions spaced equidistantly from said one electrode on the same face of said one zone; one of said pair of conductivity zones being positioned on said one face of said one zone intermediate said base electrodes and the other of said pair being coextensive and contiguous with the opposite face of said one conductivity zone; means, including emitter and collector electrodes connected to said pair of conductivity zones respectively, for establishing a forward bias for said base-emitter junction and a reverse bias for said base-collector junction; and a further bias means connected to said base electrodes for effectively restricting the forward bias of said base-emitter junction to a portion of said junction disposed toward one of said base electrodes.

2. A transistor device comprising: a semi-conductor body having a first conductivity zone of one type and having a pair of conductivity zones of a second type defining with said first zone base-emitter and base-collector junctions; a pair of base electrodes one of which is positioned approximately at the geometrical center of one face of said first zone and the other being a conductive ring disposed concentrically with respect to said one electrode on the same face of said one zone; one of said pair of conductivity zones being annular in form and positioned on said one face of said one zone intermediate said base electrodes and the other of said pair being contiguous with at least that portion of the opposite face of said one conductivity zone as is encompassed by a projection of said annular zone such that the area of said other zone is at least equal to the total area surrounded by said annular zone; means, including emitter and collector electrodes connected to said pair of conductivity zones respectively, for establishing a forward bias for said base-emitter junction and a reverse bias for said base-collector junction; and a further bias means connected to said base electrodes for effectively restricting the forward bias of said base-emitter junction to a portion of said junction disposed toward said one of said base electrodes.

3. A transistor device comprising: a semi-conductor body having a first conductivity zone of one type and having a pair of conductivity zones of a second type defining with said first zone base-emitter and base-collector junction; a pair of base electrodes one of which is positioned approximately at the geometrical center of one face of said first zone and the other having portions spaced equidistantly from said one electrode on the same face of said one zone; the one of said pair of conductivity zones comprising said base-emitter junction being annular in form and positioned on said one face of said one zone intermediate said base electrodes; the other of said pair of conductivity zones being contiguous with at least the central portion of the opposite face of said one conductivity zone such that the area of said other zone is at least equal to the total area surrounded by said annular zone; means, including emitter and collector electrodes connected to said pair of conductivity zones respectively, for establishing a forward bias for said base-emitter junction and a reverse bias for said base-collector junction; and a further bias means connected to said base electrodes for effectively restricting the forward bias of said base-emitter junction to a portion of said junction disposed toward said one base electrode.

4. A transistor device comprising: a semi-conductor body having a first conductivity zone of one type and having a pair of conductivity zones of a second type defining with said first zone base-emitter and base-collector junctions; a pair of base electrodes one of which is positioned approrimately at the geometrical center of one face of said first zone and the other having portions spaced equidistantly from said one electrode on the same face of said one zone; the one of said pair of conductivity zones comprising said base-collector junction being positioned on said one face of said one zone intermediate said base electrodes; the other of said pair of conductivity zones being coextensive and contiguous with the opposite face of said one conductivity zone; means, including emitter and collector electrodes connected to said pair of conductivity zones respectively, for establishing a forward bias for said base-emitter junction and a reverse bias for said base-collector junction; and a further bias means connected to said base electrodes for effectively restricting the forward bias of said base-emitter junction to a portion of said junction disposed toward one of said base electrodes.

5. A transistor device comprising: a semi-conductor body having a first conductivity zone of one type and having a pair of conductivity zones of a second type defining with said first zone base-emitter and base-collector junctions; a pair of base electrodes one of which is positioned approximately at the geometrical center of one face of said first zone and the other having portions spaced equidistantly from said one electrode on the same face of said one zone; the one of said pair of conductivity zones comprising said base-collector junction being annular in form and positioned on said one face of said one zone intermediate said base electrodes; the other of said pair of conductivity zones being contiguous with at least the central portion of the opposite face of said one conductivity zone such that the area of said other zone is at least equal to the total area surrounded by said annular zone; means, including emitter and collector electrodes connected to said pair of conductivity zones respectively, for establishing a forward bias for said base-emitter junction and a reverse bias for said base-collector junction; and further bias means for establishing said other base electrode at a potential, relative to said one electrode which is of the same polarity as said emitter zone and of such value as to restrict the forward bias of said base-emitter junction to the geometric central portion thereof.

6. A transistor device comprising: a semi-conductor body having a first conductivity zone of one type and having a pair of conductivity zones of a second type defining with said first zone base-emitter and base-collector junctions; a pair of base electrodes one of which is positioned approximately at the geometrical center of one face of said first zone and the other having portions spaced equidistantly from said one electrode on the same face of said one zone; the one of said pair of conductivity zones comprising said base-collector junction being positioned on said one face of said one zone intermediate said base electrodes; the other of said pair of conductivity zones being coextensive and contiguous with the opposite face of said one conductivity zone; means, including emitter and collector electrodes connected to said pair of conductivity zones respectively, for establishing a forward bias for said base-emitter junction and a reverse bias for said base-collector junction; and further bias means for establishing said other base electrode at a potential, relative to said one electrode which is of the same polarity as said emitter zone and of such value as to restrict the forward bias of said base-emitter junction to the peripheral portion thereof.

References Cited in the file of this patent

UNITED STATES PATENTS

| | | |
|---|---|---|
| 2,801,348 | Pankove | July 30, 1957 |
| 2,870,345 | Overbeek | Jan. 20, 1959 |
| 2,896,151 | Zelinka | July 21, 1959 |